(12) United States Patent
Chen

(10) Patent No.: US 8,739,709 B2
(45) Date of Patent: Jun. 3, 2014

(54) COMBINED TREATMENT PROCESS OF DOMESTIC GARBAGE AND SEWAGE

(75) Inventor: Ying Chen, Shijiazhuang (CN)

(73) Assignee: Hebei Building Materials Industry Design and Research Institute, Shijiazhuang (CN)

( * ) Notice: Subject to any disclaimer, the term of this patent is extended or adjusted under 35 U.S.C. 154(b) by 0 days.

(21) Appl. No.: 13/519,269

(22) PCT Filed: Mar. 14, 2011

(86) PCT No.: PCT/CN2011/071758
§ 371 (c)(1),
(2), (4) Date: Jun. 26, 2012

(87) PCT Pub. No.: WO2011/116656
PCT Pub. Date: Sep. 29, 2011

(65) Prior Publication Data
US 2013/0008359 A1    Jan. 10, 2013

(30) Foreign Application Priority Data
Mar. 25, 2010 (CN) .......................... 2010 1 0132010

(51) Int. Cl.
| F23G 5/00 | (2006.01) |
| F23G 5/033 | (2006.01) |
| B02C 18/00 | (2006.01) |
| B03B 7/00 | (2006.01) |
| C04B 33/132 | (2006.01) |
| C10L 5/46 | (2006.01) |

(52) U.S. Cl.
USPC ........... 110/346; 110/342; 110/220; 110/222; 110/235

(58) Field of Classification Search
USPC ................. 110/219, 220, 222, 235, 342, 346; 210/177, 179, 180, 523, 525, 532.1, 210/608, 609, 631, 703, 776, 221.2, 702, 210/770, 771, 773, 774, 748.01, 804, 806, 210/808; 209/12.1, 12.2, 39; 241/15, 16, 241/17, 18, 19, 20, 21
See application file for complete search history.

(56) References Cited

U.S. PATENT DOCUMENTS

| 2,322,017 | A | * | 6/1943 | Hartman ....................... 210/703 |
| 3,533,775 | A | * | 10/1970 | Brown ............................... 71/9 |
| 3,615,014 | A | * | 10/1971 | Hruby ........................... 209/161 |
| 3,652,405 | A | * | 3/1972 | Hess et al. .................... 110/222 |
| 3,954,605 | A | * | 5/1976 | Davies et al. ................. 210/608 |
| 4,111,800 | A | * | 9/1978 | Harendza-Harinxma .... 110/342 |
| 4,217,222 | A | * | 8/1980 | Harendza-Harinxma .... 210/177 |
| 4,886,000 | A | * | 12/1989 | Holter et al. .................. 110/345 |
| 5,585,006 | A | * | 12/1996 | Jobe ............................... 210/776 |
| 6,024,226 | A | * | 2/2000 | Olivier ........................ 209/172.5 |
| 6,190,429 | B1 | * | 2/2001 | Fujimura et al. .............. 110/346 |
| 6,405,663 | B1 | * | 6/2002 | Jones ............................ 110/342 |
| 6,553,924 | B2 | * | 4/2003 | Beaumont et al. ............ 110/238 |
| 6,863,805 | B1 | * | 3/2005 | Barreras et al. ............... 210/143 |
| 7,691,262 | B2 | * | 4/2010 | Pehrson et al. ............... 210/150 |
| 2004/0074845 | A1 | * | 4/2004 | Hagino et al. ................. 210/718 |

FOREIGN PATENT DOCUMENTS

| CN | 1280887 A | 1/2001 |
| CN | 1295881 A | 5/2001 |
| CN | 1396009 A | 2/2003 |
| CN | 1520933 A | 8/2004 |
| CN | 101274322 A | 10/2008 |
| CN | 101289336 A | 10/2008 |
| CN | 101318195 A | 12/2008 |
| CN | 101537423 A | 9/2009 |
| CN | 101786094 A | 7/2010 |
| DE | 19649901 A1 | 4/1998 |
| JP | 2000-107736 A | 4/2000 |
| JP | 2003-094438 A | 4/2003 |
| WO | 2005120713 A1 | 12/2005 |

OTHER PUBLICATIONS

International Search Report dated May 19, 2011 from PCT/CN2011/071758.
English translation of a German Office Action dated Sep. 5, 2013 corresponding to DE 11 2011 101 025.7, 7 pp.

* cited by examiner

Primary Examiner — Kenneth Rinehart
Assistant Examiner — David J Laux
(74) Attorney, Agent, or Firm — Ohlandt, Greeley, Ruggiero & Perle, LLP

(57) ABSTRACT

A combined treatment process of domestic garbage and sewage, comprising the following steps: ① sorting iron out of the domestic garbage; ② crushing the domestic garbage in which the iron has been removed; ③ feeding the crushed domestic garbage into a sewage treatment tank, adding water and blowing air into the sewage treatment tank, where the domestic garbage is divided into floating substances, suspended substances, and settled substances; ④ salvaging, dehydrating and drying the floating substances and then combusting them as fuel; ⑤ collecting, filtering and drying the settled substances, wherein the settled substances having a calorific value of more than 4180 kJ/kg are burnt as fuel, the burnt substances and the settled substances having a calorific value of less than 4180 kJ/kg are used to replace clay material in a cement plant or used for making bricks; ⑥ adding a flocculant into the sewage in which the floating substances and the settled substances have been removed so as to make the suspended substances settle, the suspended substances which have been settled are treated according to step ⑤; and ⑦ treating the sewage. The process of the present invention effectively combines the domestic garbage treatment and sewage treatment, realizing the comprehensive treatment of domestic garbage and sewage as well as efficient utilization of resources.

9 Claims, 1 Drawing Sheet

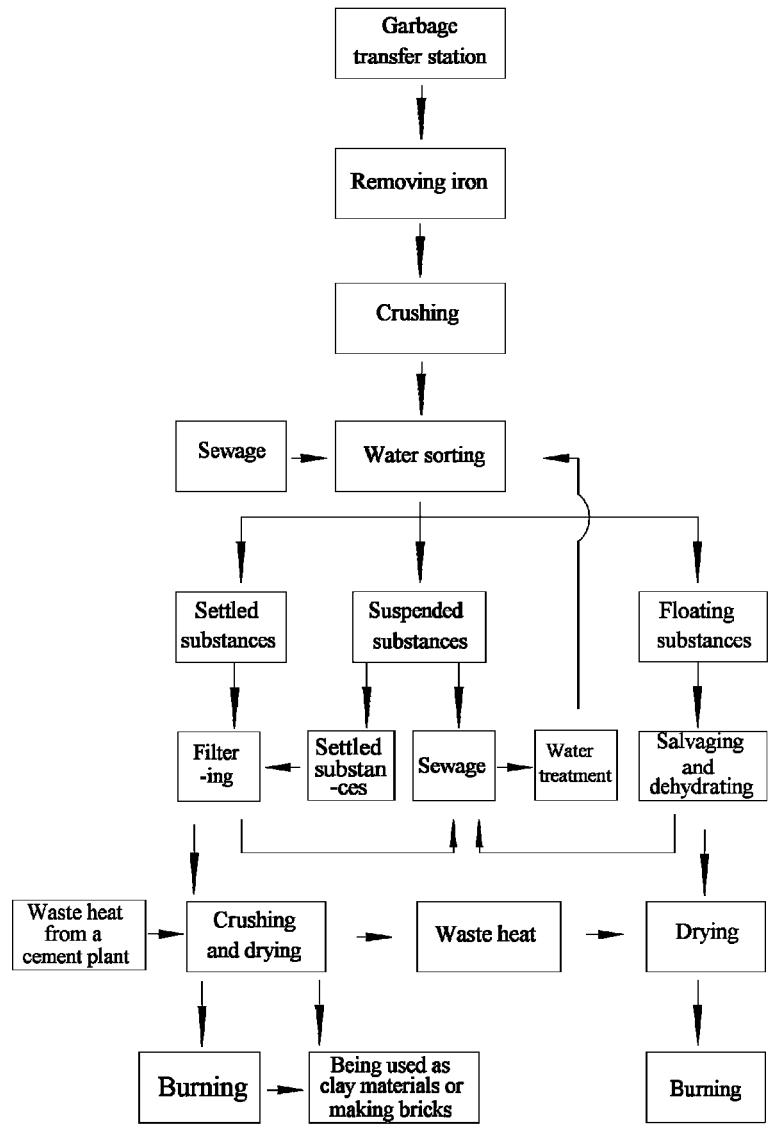

COMBINED TREATMENT PROCESS OF DOMESTIC GARBAGE AND SEWAGE

This application claims priority to Chinese Patent Publication No. 201010132010.2, filed with the State Intellectual Property Office of China on Mar. 25, 2010, entitled "COMBINED TREATMENT PROCESS OF DOMESTIC GARBAGE AND SEWAGE", which is hereby incorporated by reference.

FIELD OF THE INVENTION

The present invention relates to a field of treatment of solid wastes and sewage, in particular relates to a combined treatment process of domestic garbage and sewage.

BACKGROUND ART

With the development of economy and the acceleration of urbanization process, domestic garbage and water pollution are increasingly becoming two major problems troubling people's daily life. A lot of efforts have been made to treat domestic garbage and water pollution; however, at present, domestic garbage and water pollution are treated separately at present.

For example, the treatment of domestic garbage is generally classified as landfill, burning, methane fermentation and recovery by sorting. Landfill treatment has the advantages of lower operation cost, simple process and less investment, but suitable garbage filling lands are becoming less and less; moreover, landfill treatment actually does not completely resolve the problem of the pollution of water and air. Burning is a technology widely used in the world and has the advantages of usable heat produced in burning, harmlessness to the earth and small occupation, while having the disadvantages of large investment, high operation cost, difficulties in burning due to high water content and low calorific value of the garbage, extremely low economical efficiency, difficult vent gas treatment, and easy occurrence of secondary pollution. Methane fermentation can produce combustible gas for use in electricity generation and heat supply, favoring harmless treatment of garbage, but has the disadvantages of complicated process and equipment, advanced operation and management, susceptible to climate, requirements for supporting construction of gas thermal power plant or gas supply pipes, insignificant effect in reducing the amount of garbage, and needs for landfill. Recovery by sorting has the highest resource utilization and recovery for non-combustible resources such as metal and glass, but is highly dependent on equipment, less economically efficient in difficult sorting, requires additional harmless treatment, and suffers from great energy consume and operation cost. Due to the limitations of each of the above garbage treatment processes, practical treatment processes are established by combining two or more of them based on system engineering to treat garbage.

As disclosed in Chinese Patent Publication CN101289336, garbage is pre-sorted into after pre-sorted garbage, plastic, fibers, and bricks and stones, which are then separately subjected to fermentation, composting and the like. However, the pre-sorting step is tedious for complicated process and long period treatment. Also, the waste water produced during garbage treatment should be treated in additional sewage treatment process. Chinese Patent Publication CN101537423 disclosed a domestic garbage treating method via steaming and then water separation. Firstly, the domestic garbage is loaded into a autoclave for steaming, and then the slurry formed by steaming the perishable garbage is discharged into a water separation tank, where the garbage is separated into three layers: light-weight garbage in the upper layer, slurry of perishable garbage in the middle layer, and heavy garbage in the lower layer, which are then separately treated. This process eliminates the complicated pre-sorting step, but prolongs the garbage treating period by adopting a steaming step, which increases treatment cost and thus is not suitable for large-scale garbage treatment, and easily cause secondary pollution due to untreated sewage after water separation.

SUMMARY OF THE INVENTION

The present invention is directed to solve the technical problem of overcoming the disadvantages of complex sorting of the domestic garbage, high treatment cost, and separate treatment of domestic garbage and sewage, so as to provide a combined treatment process of domestic garbage and sewage, which eliminates the needs for garbage sorting and is capable of being operated at low cost.

To solve the above technical problem, a technical solution is provided in the present invention, which comprises the following steps:

(1) sorting iron out of the domestic garbage;

(2) crushing the domestic garbage in which the iron has been removed;

(3) feeding the crushed domestic garbage into a sewage treatment tank, adding water and blowing air into the sewage treatment tank, where the domestic garbage is divided into three layers: floating substances, suspended substances and settled substances;

(4) salvaging, dehydrating and drying the floating substances and then burning them as fuel;

(5) collecting, filtering and drying the settled substances, wherein the settled substances having a calorific value of more than 4180 kJ/kg are burnt as fuel, the burnt substances and the settled substances having a calorific value of less than 4180 kJ/kg are used to replace clay material in a cement plant or used for making bricks;

(6) adding a flocculant into the sewage in which the floating substances and the settled substances have been removed so as to make the suspended substances settle, the suspended substances which have been settled are treated according to step (5);

(7) treating the sewage.

The floating substances in step (4) and the settled substances having a calorific value of more than 4180 kJ/kg in step (5), after being dried, can be burnt as fuel in a cement plant, a thermal power plant, or a combustor having a combusting temperature of more than 1200° C. Since the combusting temperature in a cement plant and a thermal power plant is more than 1200° C., the treated floating substances and the settled substances, after being dried, have low water content and are inflammable, the vent gas thus produced contains no toxic or harmful gases such as dioxin.

The settled substances in step (5) are dried in a drying crusher or a rotary drier, by using the waste heat from a cement kiln or a thermal power plant, which not only efficiently utilize the waste heat, but also overcomes the disadvantages of difficult burning due to high water content and low calorific value of the garbage when the garbage is directly burnt.

The water used in step (3) is industrial sewage, domestic sewage, or tap water. In particular, according to the present invention, the domestic garbage is sorted by sewage; the sewage after being used for sorting is treated for use in industrial production or daily use; the sewage produced from industrial production or daily use is again used for garbage sorting; and the sewage after being used for sorting is treated again. The garbage treatment and the sewage treatment are combined through such circulation, which resolves the difficulties in sorting domestic garbage and eliminates the needs for setting a sewage treating process in a garbage treating process, thus realizing a virtuous circle.

The main component of the flocculant in step (6) is inorganic or organic low-molecule flocculant, such as those disclosed in Chinese Patent Publication CN10104149.

By adopting the above technical solution, complex garbage sorting apparatus are unnecessary, which reduces the treatment cost. By dividing garbage into three classes through water separation, treating them separately, and combining the treating process and the production process of cement (especially, the settled substances obtained after being dried can be used as fuel, or replacing the clay material as the cement components or used for making bricks), not only the cost of producing cement can be decreased, but also the degree of reduction is high. Compared with the existing technology in the prior art, the present invention not only eliminates the step of steaming, simplifies the treatment process, and shortens the treatment period, but also solves two difficulties simultaneously by combining garbage treatment and sewage treatment, wherein achieving sewage treatment during garbage treatment.

In a further improvement scheme, the floating substances or the dried settled substances are used for combusting in a cement kiln, or a thermal power plant, or a combustor having a combusting temperature of more than 1200° C. Since the temperature is higher than the decomposing temperature of toxic gases such as dioxin, it is impossible to produce toxic or harmful gases such as dioxin, and the heat produced by combustion can be efficiently utilized.

BRIEF DESCRIPTION OF THE DRAWINGS

The present invention will be further described in detail in combination with the drawings and the following detailed description.

FIG. 1 is a flow diagram of the domestic garbage treatment process according to the present invention.

DETAILED DESCRIPTION

Example 1

The flow diagram of the domestic garbage treatment process according to the present invention is shown in FIG. 1.

(1) Waste iron was sorted out of the domestic garbage by using an electromagnet, and then was delivered to a metal treating workshop for recovery via a sorting belt conveyor or transporting equipment.

(2) The domestic garbage in which the iron had been removed was fed into a crusher via a belt conveyor for crushing. For better sorting of the garbage, the particle size of the crushed garbage was not more than 10 mm.

(3) The crushed domestic garbage was fed into a sewage treatment tank, water was added, and air was blown, such that the domestic garbage was divided into three layers: floating substances, suspended substances, and settled substances.

The water used was industrial sewage or domestic sewage or tap water.

The floating substances are mainly paper materials, plastics, vegetable leaves and the like, and further comprise baby diapers, female hygiene articles and the like, which are difficult to be decomposed, but are inflammable after being dried.

Domestic garbages other than the above materials were settled to the bottom of the sewage treatment tank, or suspended in the water.

For sufficient separation of the domestic garbage, two or more sewage treatment tanks can be sequentially provided.

(4) The floating substances were salvaged, dehydrated, and dried for combusting as fuel.

A scraper was disposed at one side of the sewage tank for collecting the floating substances in the upper layer, which was then subjected to centrifuging dehydrating, pressure dehydrating, or dehydrating by plate and frame filter. The sewage produced during dehydrating flew into the sewage treatment tank for collectively treating; and the floating substances after being dehydrated were transported via a belt conveyor into a drier for drying. The dried floating substances can be combusted in a cement kiln, a thermal power plant, or other combustors having a combustion temperature higher than 1200° C. Since the combusting temperature in a cement kiln or a thermal power plant is much higher than the decomposing temperature of toxic gases such as dioxin, no secondary pollution would be produced.

(5) The settled substances were collected via a mud pump and were filtered through a plate and frame filter, the filter cake was delivered to a drying crusher, and the filtrate, that is, the sewage, flew into the sewage tank.

The settled substances after filtration was crushed and dried by a drying crusher using the waste heat from the cement kiln. The waste heat from the cement kiln had a temperature of about 400° C. to 600° C., and was fully made use of via the blower of the drying crusher. The waste heat dropped to a temperature of 120° C. to 180° C. after passing through the settled substances, and then passed through the dehydrated floating substances in step (4) to dry the same.

The calorific value of the settled substances were measured by calorimeter, wherein the settled substances having a calorific value of more than 4180 kJ/kg were transported to a cement kiln or a thermal power plant or combustors having a combustion temperature higher than 1200° C. for combusting.

The substances left after combusting and the settled substances having a calorific value of less than 4180 kJ/kg have siliceous material as their main component, and can be used for replacing clay materials in a cement plant or for making brick, which can not only improve the degree of garbage reduction, but also achieve the efficient utilization of the garbage.

(6) A flocculant was added to the sewage in which the floating substances and settled substances have been removed so as to make the suspended substances settle, which were then treated according to step (5); and the sewage flew into the sewage tank for treatment.

The suspended substances were steeled by using the novel flocculant disclosed in Chinese Patent Publication CN10104149, the use of the flocculant can result in lower water content in the sediment and ease of being dried and burnt of the sediment.

(7) The sewage was treated.

After the treating processes of step (3) to step (6), that is, salvaging or extracting via a mud pump, the floating substances, settled substances, and suspended substances in the sewage, a primary treatment (that is, a physical treatment) of the sewage was substantially completed. Then, the treated sewage can be further treated in a biological treating apparatus by either an activated sludge process which adopts reactors such as aeration tank and oxidation ditch; or a biofilm process which adopts a biofilter, a rotating bio-contactor, bio-contact oxidation process, and a biological fluidized bed.

The discharged water after being treated via the biological treating apparatus was sent to a secondary settling tank, the water discharged from the secondary settling tank, after being disinfected, was sent for a tertiary treatment. The tertiary treatment can be performed by adopting biological nitrogen and phosphorus removal process, or coagulate sedimentation, or activated carbon adsorption. The sludge produced in the secondary settling tank was treated according to step (5).

As stated above, in the prior art, the design directed to garbage treatment or sewage treatment are separately carried out, wherein sewage is inevitably generated during garbage treatment, which in turn requires the incorporation of sewage treatment process. In the present invention, the domestic garbage treatment and sewage treatment are combined. In the process of the present invention, the domestic garbage is sorted via sewage into three layers: floating substances, suspended substances and settled substances, which are separately collected and removed from the sewage by salvaging, adding fluctuant or extract via mud pump. This is equivalent to a primary treatment of the sewage; the sewage from sorting garbage is then subjected to secondary treatment and tertiary treatment. In other words, in the present invention, domestic garbage treatment and sewage treatment are combined. Moreover, the process of the present invention is also jointly operated with a cement plant or thermal power plant, which realizes the comprehensive utilization of garbage and sewage treatment.

When the water sorting process of the present invention is used for treating garbage, the processing capacity can be up to hundreds of tons per day, which can be used to treat not only the garbage newly generated but also the garbage which has been filled.

What is claimed is:

1. A combined treatment process of domestic garbage and sewage, characterized in that the process comprises the following steps:
    (1) sorting iron out of the domestic garbage;
    (2) crushing the domestic garbage in which the iron has been removed;
    (3) feeding the crushed domestic garbage into a sewage treatment tank, adding water and blowing air into the sewage treatment tank, where the domestic garbage is divided into three layers: floating substances, suspended substances and settled substances;
    (4) salvaging, dehydrating and drying the floating substances and then combusting them as fuel;
    (5) collecting, filtering and drying the settled substances, wherein the settled substances having a calorific value of more than 4180 kJ/kg are burnt as fuel, the burnt substances and the settled substances having a calorific value of less than 4180 kJ/kg are used to replace clay material in a cement plant or used for making bricks;
    (6) adding a flocculant into the sewage in which the floating substances and the settled substances have been removed so as to make the suspended substances settle, the suspended substances which have been settled are treated according to step (5);
    (7) treating the sewage.

2. The combined treatment process of domestic garbage and sewage according to claim 1, characterized in that the iron is sorted out by using electromagnetic technology in step (1).

3. The combined treatment process of domestic garbage and sewage according to claim 1, characterized in that the floating substances in step (4) and the settled substances having a calorific value of more than 4180 kJ/kg in step (5), after being dried, can be burnt as fuel in a cement plant, a thermal power plant, or a combustor having a combusting temperature of more than 1200° C.

4. The combined treatment process of domestic garbage and sewage according to claim 1, characterized in that at least one sewage treating tank is disposed in step (3).

5. The combined treatment process of domestic garbage and sewage according to claim 1, characterized in that the dehydrating in step (4) is carried out by pressurized dehydrating, dehydrating by plate and frame filter, or centrifuging dehydrating.

6. The combined treatment process of domestic garbage and sewage according to claim 1, characterized in that the drying in step (5) is carried out in a drying crusher or a rotary drier.

7. The combined treatment process of domestic garbage and sewage according to claim 6, characterized in that the drying crusher or the rotary drier uses waste heat from a cement kiln or a thermal power plant for the drying.

8. The combined treatment process of domestic garbage and sewage according to claim 1, characterized in that the domestic garbage in step (2) is crushed so as to have a particle size of not more than 10 mm.

9. a combined treatment process of domestic garbage and sewage, characterized in that the process comprises the following steps:
    (1) sorting iron out of domestic garbage;
    (2) crushing the domestic garbage in which the iron has been removed;
    (3) feeding the crushed domestic garbage into a sewage treatment tank, adding a substance selected from the group consisting of industrial sewage, domestic sewage, or tap water, and blowing air into the sewage treatment tank, where the domestic garbage is divided into three layers: floating substances, suspended substances and settled substances;
    (4) salvaging, dehydrating and drying the floating substances and then combusting them as fuel;
    (5) collecting, filtering and drying the settled substance, wherein the settled substances having a calorific value of more than 4180 kJ/kg are burnt as fuel, the burnt substances and the settled substances having a calorific value of less than 4180 kJ/kg are used to replace clay material in a cement plant or used for making bricks;
    (6) adding a flocculant into the sewage in which the floating substances and the settled substances have been removed so as to make the suspended substances settle, the suspended substances which have been settled are treated according to step (5);
    (7) treating the sewage.

* * * * *